United States Patent
Gagner et al.

(10) Patent No.: US 9,536,373 B2
(45) Date of Patent: *Jan. 3, 2017

(54) GAMING SYSTEM HAVING DYNAMIC PAYBACK PERCENTAGE AS A FUNCTION OF ENABLED FEATURES

(71) Applicant: Bally Gaming, Inc., Las Vegas, NV (US)

(72) Inventors: Mark B. Gagner, West Chicago, IL (US); Robert L. Kyte, Chicago, IL (US); Michael W. Mastropietro, Chicago, IL (US); Jeremie D. Moll, Las Vegas, NV (US); Matthew J. Ward, Northbrook, IL (US); Peter R. Anderson, Glenview, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,682

(22) Filed: Oct. 6, 2015

(65) Prior Publication Data

US 2016/0027233 A1  Jan. 28, 2016

Related U.S. Application Data

(63) Continuation of application No. 13/758,874, filed on Feb. 4, 2013, now Pat. No. 9,205,324, which is a (Continued)

(51) Int. Cl.
*G07F 17/32* (2006.01)
*A63F 13/00* (2014.01)
(Continued)

(52) U.S. Cl.
CPC ............... *G07F 17/32* (2013.01); *A63F 9/24* (2013.01); *A63F 13/00* (2013.01); *G06F 3/0484* (2013.01); *G07F 17/322* (2013.01); *G07F 17/326* (2013.01); *G07F 17/3211* (2013.01); *G07F 17/3248* (2013.01); *G07F 17/3258* (2013.01); *A63F 2009/245* (2013.01)

(58) Field of Classification Search
USPC ......................................... 463/20, 25, 26, 29
See application file for complete search history.

(56) References Cited

U.S. PATENT DOCUMENTS 6,932,701 B2   8/2005   Glavich
7,131,908 B2   11/2006  Baerlocher
(Continued)

OTHER PUBLICATIONS

PCT International Search Report for International Application No. PCT/US2008/008602 dated Oct. 22, 2008 (2 pages).
(Continued)

*Primary Examiner* — Dmitry Suhol
*Assistant Examiner* — Brandon Gray
(74) *Attorney, Agent, or Firm* — Nixon Peabody LLP

(57) ABSTRACT

A method of operating a wagering game comprises detecting receipt of a primary wager for playing a primary wagering game, and activating a first bonus feature in response to one or more first eligibility criteria, the first bonus feature having a first bonus payback percentage. The method further comprises activating a second bonus feature in response to one or more second eligibility criteria, the one or more second eligibility criteria including activation of the first bonus feature. The second bonus feature has a second bonus payback percentage higher than the first bonus payback percentage. The method further comprises displaying a randomly selected outcome of the primary wagering game, and in response to at least one triggering event associated with the first and the second bonus features, conducting the first or second bonus feature if the first and second bonus feature is active.

19 Claims, 8 Drawing Sheets

Related U.S. Application Data continuation of application No. 12/670,331, filed as application No. PCT/US2008/008602 on Jul. 15, 2008, now Pat. No. 8,393,956.

(60) Provisional application No. 60/962,123, filed on Jul. 26, 2007, provisional application No. 60/967,196, filed on Aug. 31, 2007.

(51) Int. Cl.
*A63F 9/24* (2006.01)
*G06F 3/0484* (2013.01)

(56) References Cited

U.S. PATENT DOCUMENTS

| | | | |
|---|---|---|---|
| 2004/0224746 A1 | 11/2004 | Fong | |
| 2004/0266510 A1 | 12/2004 | Kojima | |
| 2005/0130731 A1 | 6/2005 | Englman | |
| 2005/0250578 A1 | 11/2005 | Slomiany | |
| 2006/0084496 A1 | 4/2006 | Jaffe | |
| 2007/0060241 A1* | 3/2007 | Low | G07F 17/3267 463/13 |
| 2007/0060292 A1 | 3/2007 | Peterson | |
| 2007/0155485 A1 | 7/2007 | Cuddy | |
| 2008/0113811 A1* | 5/2008 | Linard | G07F 17/32 463/42 |
| 2009/0143136 A1 | 6/2009 | Thomas | |
| 2013/0150151 A1* | 6/2013 | Gagner | G07F 17/32 463/25 |

OTHER PUBLICATIONS

PCT International Written Opinion for International Application No. PCT/US2008/008602 dated Oct. 22, 2008 (5 pages).

\* cited by examiner

GAMING SYSTEM HAVING DYNAMIC PAYBACK PERCENTAGE AS A FUNCTION OF ENABLED FEATURES

CROSS REFERENCE TO RELATED APPLICATIONS

This application is a continuation of prior application Ser. No. 13/758,874, filed Feb. 4, 2013, now allowed, which is a continuation of prior application Ser. No. 12/670,331, filed Jan. 22, 2010, now issued as U.S. Pat. No. 8,393,956, which was the National Stage of International Application No. PCT/US2008/008602, filed Jul. 15, 2008, which claims the benefit of U.S. Provisional Application No. 60/962,123, filed Jul. 26, 2007, and U.S. Provisional Application No. 60/967,196, filed Aug. 31, 2007, each of which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having dynamic payback percentages as a function of enabled features.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

Traditionally, wagering games have employed relatively smaller numbers of bonus or supplemental features. Moreover, with activation of multiple bonus features, one problem that arises is that because of limited payback percentages provided my gaming machines, the frequency and size of bonus awards dispensed with such features is reduced. Another problem arises in that a player's perception of risk versus reward causes there to be a disincentive to the player to activate multiple features. This occurs because of the perception that each additional feature involves additional cost to the player, but the benefit is not perceived to be commensurate with such cost. In other words, activating larger number of features does not always result in the player receiving and participating in a proportionately increased number of bonus awards and features. Yet another problem arises in that additional costs of activating such bonus features are not always offset by increased payback percentages or expected values of awards paid out therefrom. The present invention is directed to solving these and other problems.

SUMMARY OF THE INVENTION

According to one aspect of the present invention, a method of operating a wagering game comprises detecting receipt of a primary wager for playing a primary wagering game, and activating a first bonus feature in response to one or more first eligibility criteria, the first bonus feature having a first bonus payback percentage. The method further comprises activating a second bonus feature in response to one or more second eligibility criteria, the one or more second eligibility criteria including activation of the first bonus feature. The second bonus feature has a second bonus payback percentage higher than the first bonus payback percentage. The method further comprises displaying a randomly selected outcome of the primary wagering game, and in response to at least one triggering event associated with the first and the second bonus features, conducting the first or second bonus feature if the first and second bonus feature is active.

According to another aspect of the invention, a method of operating a wagering game comprises detecting receipt of a primary wager for playing a primary wagering game, activating a first bonus feature in response to a first eligibility criterion, and activating a second bonus feature in response to a second eligibility criterion. The method further comprises displaying a randomly selected outcome of the primary wagering game, and in response to a first triggering event associated with the first bonus feature, conducting the first bonus feature if the first bonus feature is active. The method further comprises, in response to a second triggering event associated with the second bonus feature, conducting the second bonus feature if the second bonus feature is active, wherein an aggregate payback percentage of the wagering game increases upon activation of the first bonus feature and further increases upon activation of the second bonus feature.

According to yet another aspect of the invention, a method of operating a wagering game comprises detecting receipt of a primary wager for playing a primary wagering game, activating a first bonus feature in response to a first eligibility criterion, the first bonus feature having a first bonus payback percentage, and activating a second bonus feature in response to a second eligibility criterion, the second bonus feature having a second bonus payback percentage. The second bonus payback percentage is higher than the first bonus payback percentage. The method further comprises displaying a randomly selected outcome of the primary wagering game. The method further comprises, in response to a first triggering event, selecting either the first bonus feature or the second bonus feature, and in response to the selection of the first or second bonus feature, conducting the selected bonus feature. The method further comprises, in response to a second triggering event, conducting the second bonus feature, wherein an aggregate payback percentage of the wagering game increases upon activation of the first bonus feature and further increases upon activation of the second bonus feature.

According to yet another aspect of the invention, a computer readable storage medium is encoded with instructions for directing a gaming system to perform the above method.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
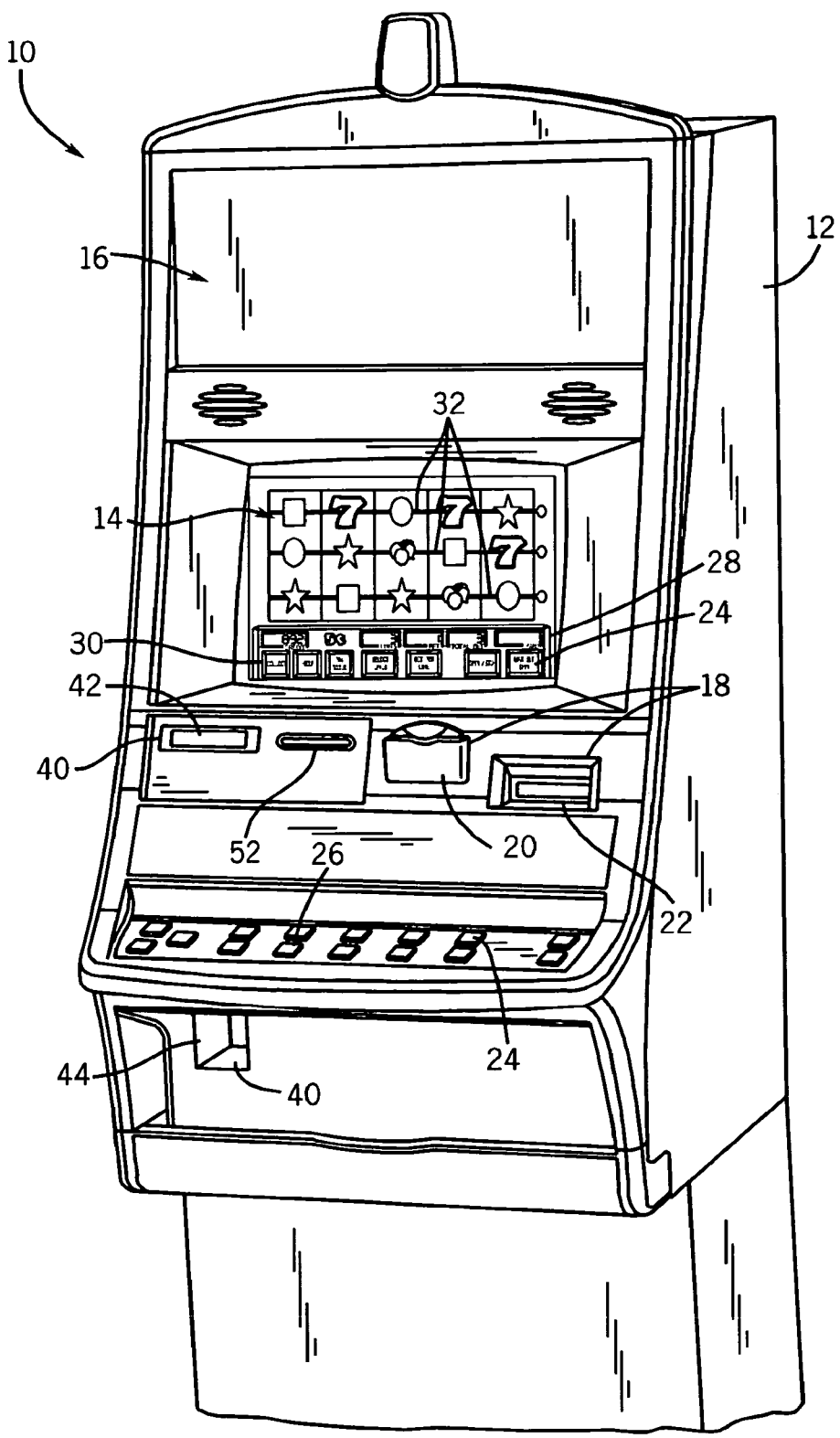
FIG. 1a is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1a, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, any other game compatible with a display comprising at least one symbol-bearing reel strip. The gaming machine 10 may also be a hybrid gaming machine integrating both electronic and electromechanical displays.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1a). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1a, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 of the gaming machine 10 may include a number of mechanical reels to display the outcome in visual association with at least one payline 32. Alternatively, the primary display 14 may take the form of a hybrid display incorporating both electromechanical display components, such as reels, with an electronic display, which may include a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1a as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
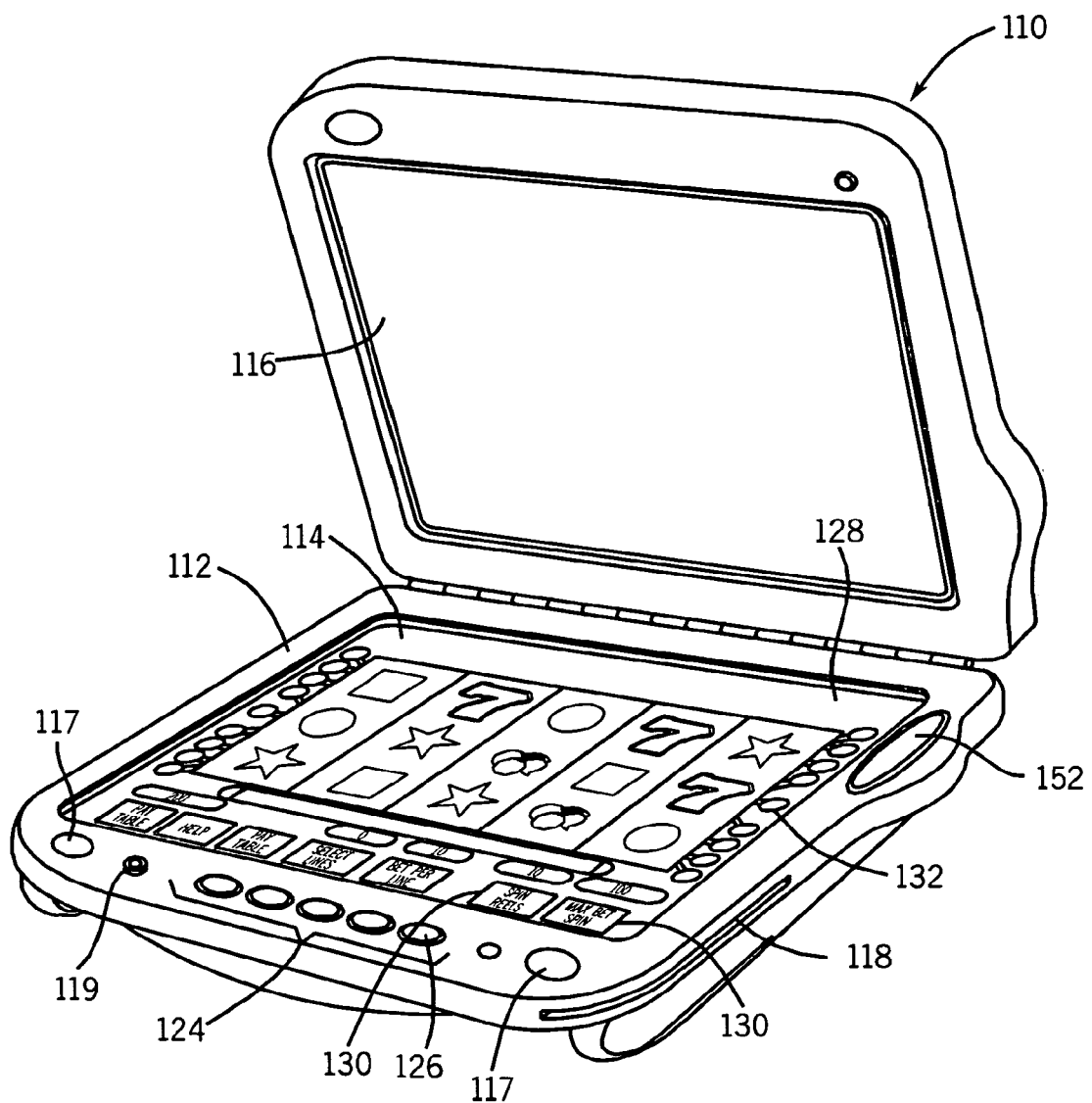
FIG. 1b is a perspective view of a handheld gaming machine embodying the present invention.

Depicted in FIG. 1b is a handheld or mobile gaming machine 110. Like the free standing gaming machine 10, the handheld gaming machine 110 is preferably an electromechanical gaming machine configured to play mechanical slots, any other game compatible with a display comprising at least one symbol-bearing reel strip. The handheld gaming machine 110 may also be a hybrid gaming machine integrating both electronic and electromechanical displays. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1b, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1b, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably includes a number of mechanical reels to display the outcome in visual association with at least one payline. Alternatively, the primary display 114 may take the form of a hybrid display incorporating both electromechanical display components, such as reels, with an electronic display, which may include a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 118 or an assignment of credits stored on the handheld gaming machine via the player input device 124, e.g. the touch screen keys 130 or push buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1b, comprises a biometric sensing device.

Figure 2:
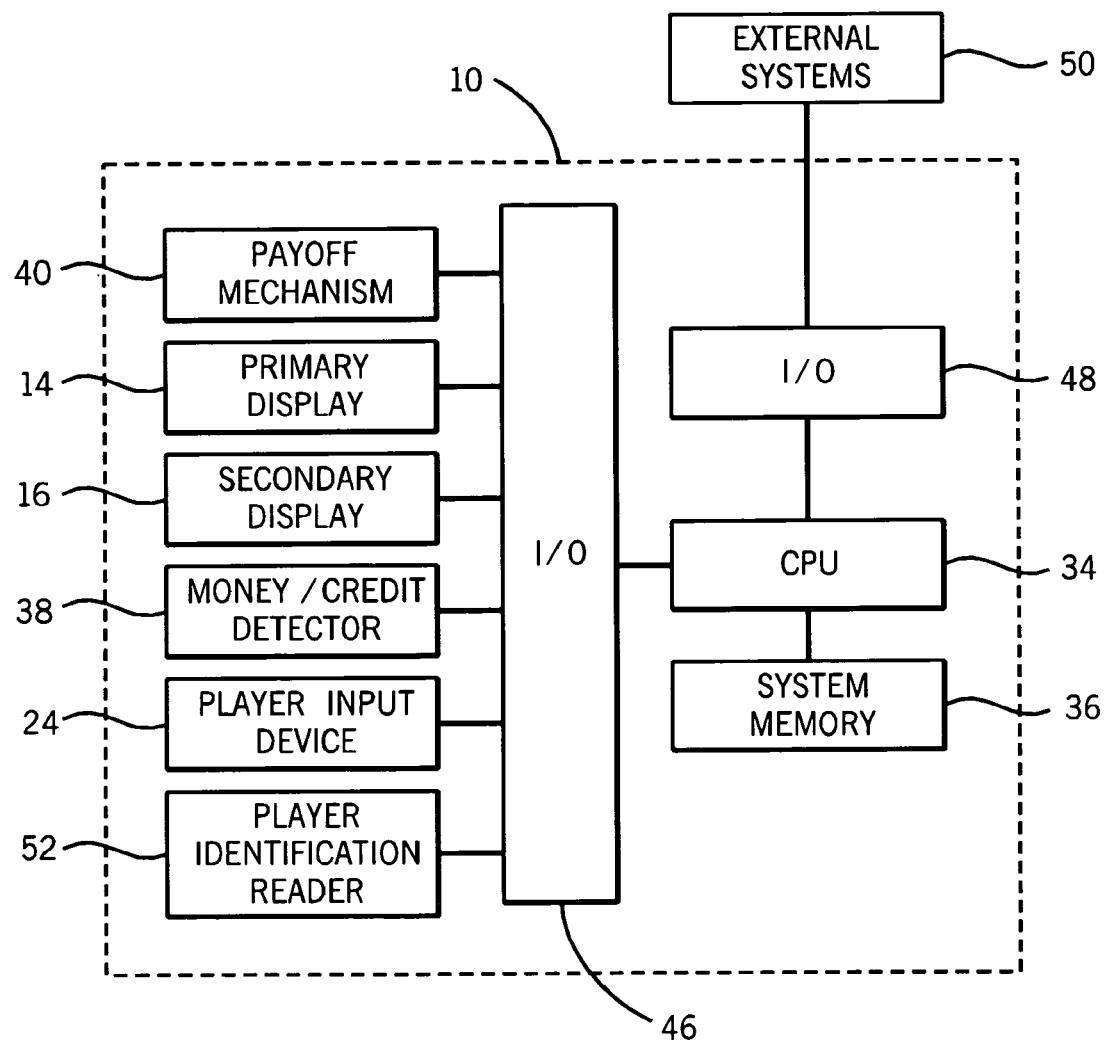
FIG. 2 is a block diagram of a control system suitable for operating the gaming machines of FIGS. 1a and 1b.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1a, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
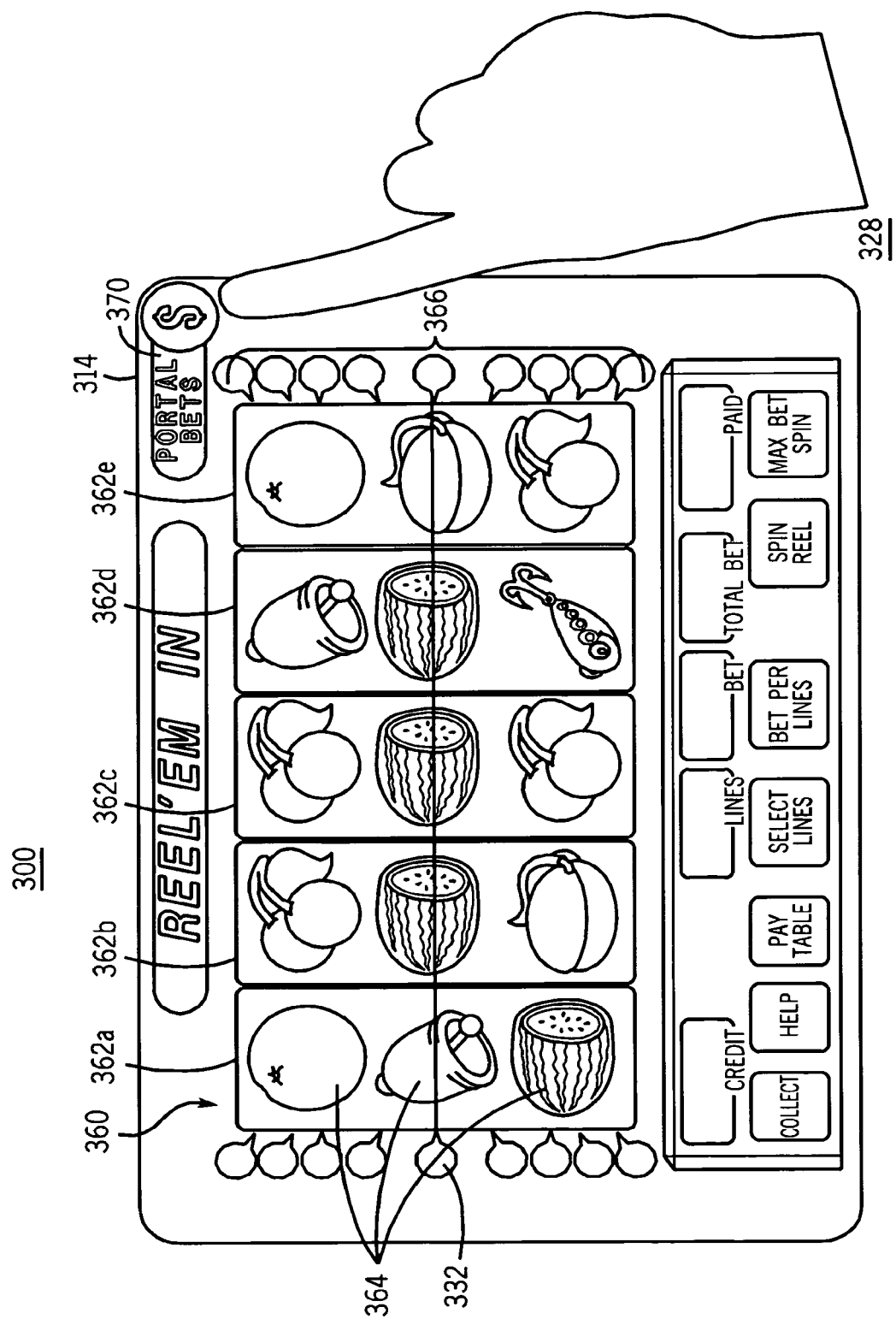
FIG. 3 is a screen shot of a primary display of a gaming system including a feature icon.

Turning now to FIG. 3, a primary display 314 of a gaming system 300 is shown. The primary display 314 may be any form of display such as those described herein with reference to the free standing and handheld gaming devices of FIGS. 1a and 1b. The primary display 314 includes display of a primary wagering game 360, which in this embodiment is a slot game as shown in FIG. 3. The slot game 360 includes a plurality of reels 362a,b,c,d,e which may be either electromechanical reels or simulations thereof on the primary display 314. The reels 362a,b,c,d,e include a plurality of symbols 364 displayed thereon which vary as the reels 362a,b,c,d,e are spun and stopped. The symbols 364 may include any variety of graphical symbols, elements, or representations, including symbols 364 which are associated with one or more themes of the gaming machine or system. The symbols 364 may also include a blank symbol, or empty space. As described herein the symbols 364 landing on the active paylines 332 (the paylines for which a wager has been received) are evaluated for winning combinations. If a winning combination of symbols 364 lands on an active payline 332 a primary award is awarded in accordance with a pay table of the gaming device. The symbols 364 on the reels 362a,b,c,d,e form an array 366 or matrix of symbols 364, having a number of rows and columns, which in the embodiment shown is four rows and five columns. In alternate embodiments, the array 366 may have greater or fewer symbols 364, and may take on a variety of different forms having greater or fewer rows and/or columns. The array 366 may even comprise other non-rectangular forms or arrangements of symbols 364.

The system 300 further includes a feature icon 370 for displaying and receiving selection and activation of various supplemental or bonus features to the wagering game 360. The feature icon 370 in FIG. 3 comprises a graphical icon or button entitled "Portal Bets." In other embodiments, other icons or graphics may be utilized, and may include isolated buttons, icons, or even a graphical bar or menu, for example across the top, bottom, or side of the display 314. The feature icon 370 can be selected or activated by a player of the wagering game 360 through a touch screen 328 overlying the display 314, or through any other appropriate player input device as described herein with relation to FIGS. 1a, 1b and 2. In FIG. 3, the player is seen activating the feature icon 370 by selecting it via the touch screen 328.

Figure 4:
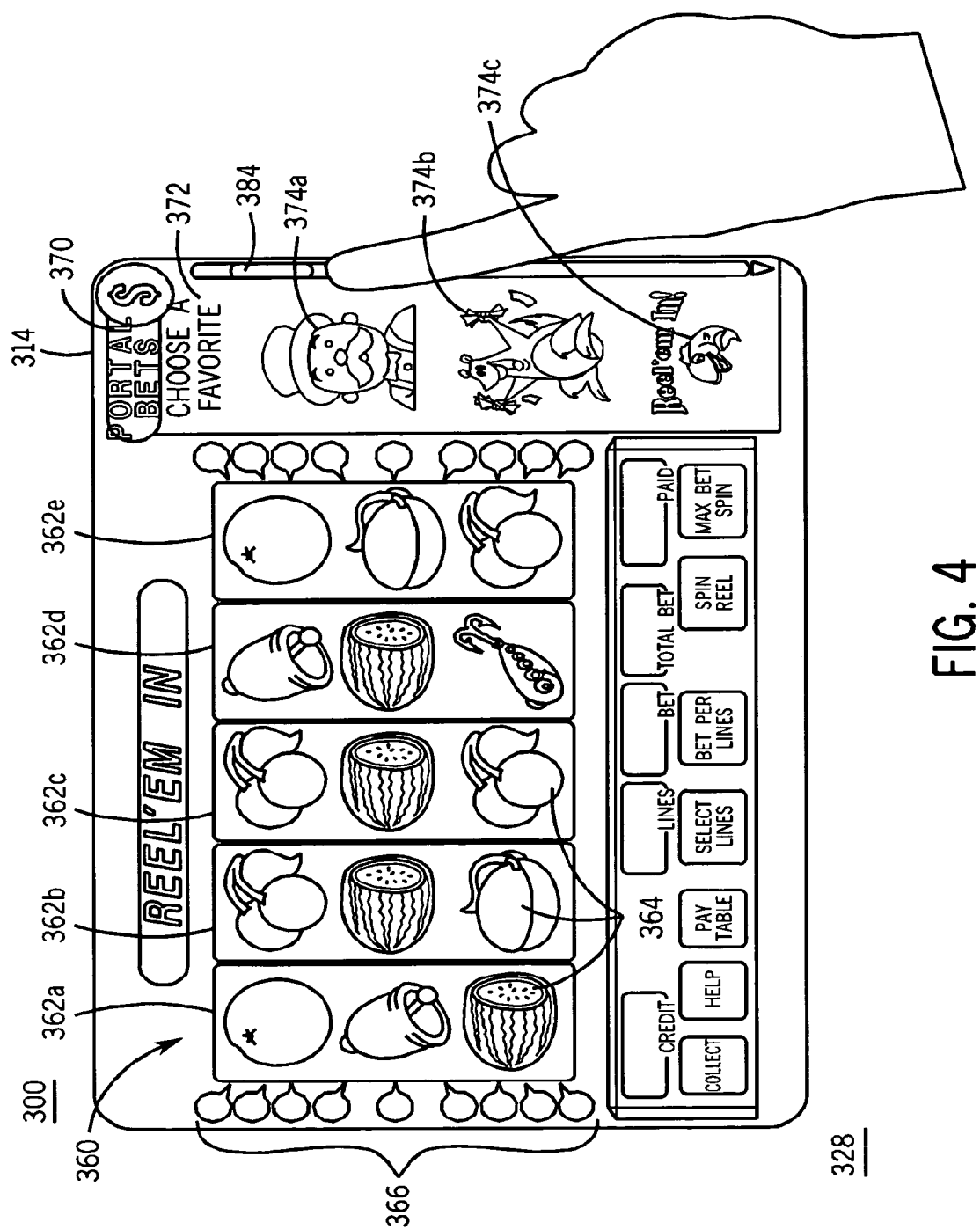
FIG. 4 is a screen shot of the primary display of FIG. 3 including a feature menu.

Turning to FIG. 4, once the feature icon 370 has been selected or activated, a feature menu 372 is displayed on the primary display 314 of the system 300. The feature menu 372 includes a plurality of available bonus features 374 which are provided for activation or selection in addition to the primary wagering game 360. In FIG. 4, three available features 374a,b,c are shown which correspond to three different themed features, a Monopoly feature 374a, a Lucky Lemming feature 374b, and a Reel 'Em In feature 374c. Any one or more of the features 374a,b,c displayed may be activated by a player, in this embodiment, by touching the touch screen 328 at an appropriate location to select the desired feature or features 374a,b,c. In an embodiment, selection and activation of one of the features 374 requires input of an additional wager in the form of a secondary wager, side bet, or other monetary input. Thus, in one embodiment, selection of a desired feature 374 causes a player's wager account to be debited in an appropriate amount associated with the feature. In an alternative embodiment, one or more of the features 374 may be activated or selected without placing additional wagers or incurring additional fees. In yet another alternative embodiment, the cost of additional features 374 may be debited from or supplied by player loyalty points, frequent player points, comps, player tracking card points, a designated feature fund, or other collected secondary economy accounts, instead of or in addition to currency wagers.

In addition, the feature menu 372 includes a menu controller 384 for scrolling through visible and obscured selections. In this embodiment, the menu controller 384 is a scroll bar depicted on the right edge of the feature menu 372. For example, when the feature icon 370 is first selected, some of the plurality of available features 374 are displayed while others are obscured as being lower in the feature menu 372 window. The slider bar 384 may be utilized to scroll or slide down within the window of the feature menu 372 so as to reveal previously obscured features 374 which are available. In alternative embodiments, many other menu controllers 384 may be utilized instead of or in addition to the scroll bar. For example, the menu controller 384 may comprise a knob, wheel, joystick, or other physical controller such as Up and Down arrows or keys. Moreover, the menu controller 384 may comprise soft key equivalents of these physical devices, such as a virtual knob, dial, page up button, page down button, arrows, wheels, roller balls, etc. which receive inputs through the touch screen 328 controlling movement of the features 374 in the feature menu 372.

The features 374 available for activation may take on many different forms, and are available to players in addition to one or more basic wagering games 360 of the system 300. Any number of wagering game features 374 are available to be activated by a player of the gaming system 300. The features 374 may include any number of improvements, additions, enhancements, or modifications of a standard basic wagering game experience displayed on the primary display 314. For example, the features 374 may include eligibility or participation in bonus games, progressive jackpots or awards, community games or events, including group games, team competitions, and competitive or collaborative play. The features 374 may also include wagering game assets such as free spins, wild symbols, multipliers, symbol upgrades, expanding wild symbols, scatter symbols, etc. The features 374 may also include eligibility or participation in secondary wagering games, side-bet games, reel re-spins, or extra chances or opportunities during play of the primary wagering games.

In other embodiments, the features 374 which may be activated may include features usable in a selection game, such as additional selections, opportunities to replace or re-do a prior selection, opportunities to undo a poor selection or selection of a terminating symbol, etc. Moreover, the features 374 may include eligibility or participation in enhanced awards, improvements of randomly selected outcomes of a primary wagering game, advancement to higher levels of play, advancement to newer or more favorable episodes of wagering games, etc. In yet other embodiments, features 374 may include eligibility and participation in additional wagering games, other games within a casino or gaming establishment (e.g. other table games or electronic games), wide area progressive jackpots, local area progressive jackpots, tangible prize awards, player reward points and loyalty programs, etc. The features 374 of the gaming system 300 as described herein may comprise any feature available on a wagering game which may be funded by an increased wager, a side wager, a secondary or separate wager, via player reward points, or in any other manner utilizing any form of currency, monetary input or other value.

It should also be understood that the features 374 activated in the system 300 of the present invention may be any number of available wagering game features as described herein. Moreover, the features 374 may include any enhancements or additions to the primary wagering game as described in detail in U.S. Patent Application Ser. No. 60/844,032 filed on Sep. 12, 2006, and US. Patent Application Ser. No. 60/802,984 filed on May 24, 2006, both of which are assigned to WMS Gaming Inc. Both such applications are hereby incorporated by reference, in their entirety, as if full set forth herein.

When the feature icon 370 is selected and the feature menu 372 appears, the display of the primary wagering game 360 may be altered or adjusted so as to accommodate the presence of the feature menu 372. In FIG. 4, for example, the randomly selected outcome of the primary wagering game 360 has been reduced in size, as compared to its original presentation in FIG. 3. The adjustment of the primary wagering game 360 may take on many forms. For example, the primary wagering game 360 may be resized, by either increasing the size or reducing the size of the wagering game 360 on the primary display 314. Adjustments in size may be done so as to preserve the aspect ration of the wagering game 360 (for example, the reduction from FIG. 3 to FIG. 4). In an alternative embodiment, the aspect ratio of the primary wagering game 360 may be altered, for example, by keeping the height of the wagering game 360 the same, and reducing or enlarging the width of the display of the primary wagering game 360, or vice versa, by adjusting the height while fixing the width. In yet another alternative embodiment, the wagering game 360 may be moved on the primary display 314 to provide additional screen room for the feature menu 372. Other adjustment techniques are possible so as to provide additional room on the display 314 for the feature menu 372. Combinations of two or more of these adjustment techniques may also be utilized.

Figure 5:
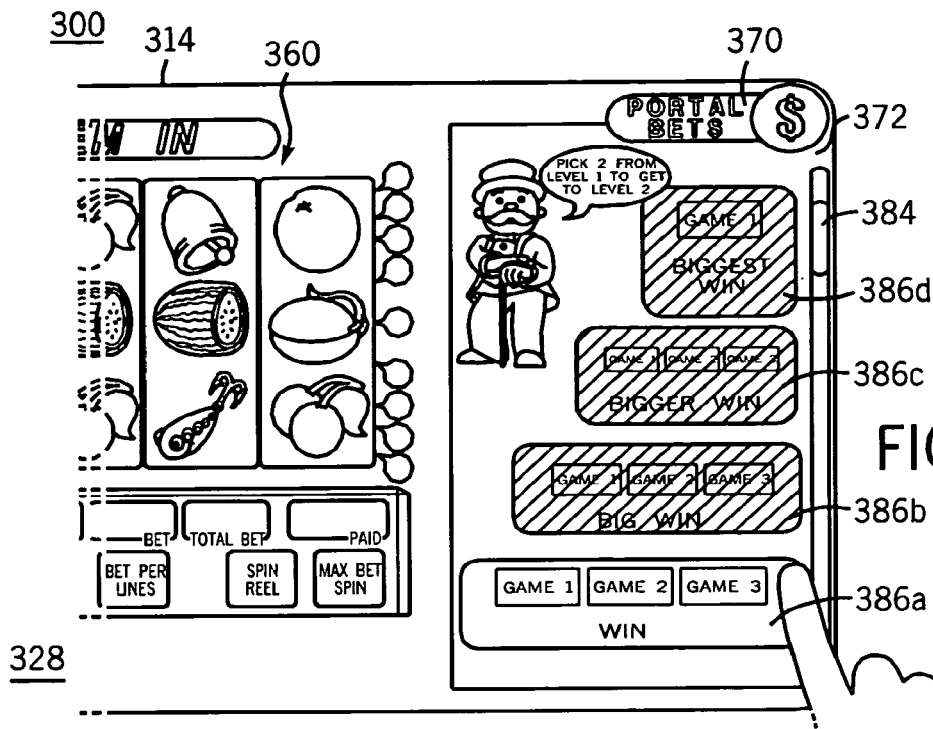
FIG. 5 is a screen shot of a primary display including a feature menu having a graphically displayed rule set.
Figure 6:
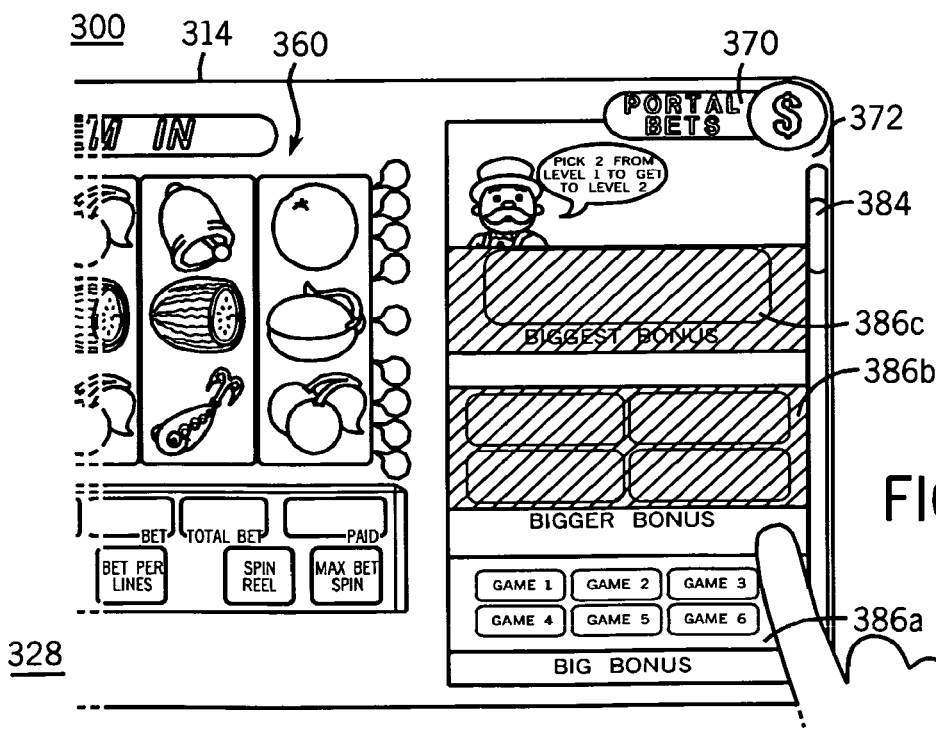
FIG. 6 is a screen shot of a primary display including an alternative feature menu having a graphically displayed rule set.

Turning to FIGS. 5 and 6, other alternative embodiments of the feature menu 372 are displayed as shown on the primary display 314. In these embodiments, the feature menu 372 includes a plurality of levels or tiers 386a,b,c,d, with each tier 386a,b,c,d having one or more features 374 therein. The tiers 386a,b,c,d may be organized in any logical and appropriate fashion, and in an embodiment, increasing levels of tiers 386a,b,c,d provide higher expected rates of return or payback percentages. Thus, in such embodiments, in exchange for activating multiple features (one or more for each tier 386) a player is rewarded with increasing levels of payback percentages. In other embodiments, the organization of the tiers 386 may be according to different criteria. Each successively higher tier 386 has a rule set, or eligibility requirement which may need to be satisfied in order for a player to be permitted to select from or activate features 374 within such tier 386. For example, as seen in FIGS. 5 and 6, a player must activate two of the features 374 in the Level 1 tier 386a (where the player's finger is pointing), in order to be eligible to select any features 374 in the second tier 386b. Such rules or criteria may be communicated to the player via the feature menu 372 or elsewhere on the primary display 314 or other display. In this instance, the Mr. Monopoly character informs the player of the eligibility requirement explained by stating "Pick 2 from Level 1 to get to Level 2." Additionally, the Level 2 tier 386b (as well as Levels 3 and 4 386c,d) are shown as "grayed out" or ghosted so as to signify their inactive status until the eligibility requirements have been satisfied so as to unlock or activate such tiers 386*b,c,d*. Once the player succeeds in satisfying the rule set and eligibility is met, the appropriate tier 386*b* will be activated, the ghosting will be removed, and the features 374 in such tier 386*b* will be available for selection.

A variety of graphical depictions of such rule sets or eligibility criteria may be used so as to communicate the content of those rule sets to the player. For example, the physical hierarchy of FIGS. 5 and 6 may be used to show successively higher levels stacked on top of lower levels. In other embodiments, lines, arrows, or other mapping graphics may be used so as to show one or more paths linking features 374 which are locked or unlocked based upon the selection or activation of other features 374. For example, the graphics may be generated dynamically such that when one feature 374 is selected, all other available features 374 which become eligible as a result thereof are mapped to the selected feature with lines or arrows. Thus, a player can follow a path of linked or associated features 374 by making successive selections thereof. Yet another method of showing such dependent feature scheme involves stacking the features in a pyramid to show higher levels becoming available as criteria in lower levels is satisfied.

The features 374 available on the various tiers 386 may be organized according to differing payback percentages. Therefore, in one embodiment, features 374 in higher tiers 386 may provide larger payback percentages than features 374 in lower tiers 386. For example, as seen in FIG. 5, the features 374 in the Level 1 tier 386*a* may have payback percentages from 85-90%, the features 374 in the Level 2 tier 386*b* may have payback percentages from 87-93%, the features 374 in the Level 3 tier 386*c* may have payback percentages from 90-98%, and the features 374 in the Level 4 tier 386*d* may have payback percentages from 95-105%. Many other configurations are possible. The rule set that controls the features 374 which are made available for selection may take into account the payback percentages of the various features 374. For example, a 105% payback percentage feature 374 in the Level 4 tier may only become available if one or more features 374 are selected from each of the Level 1, 2, and 3 tiers, having lower payback percentages. This is done to insure that an aggregate payback percentage of the gaming system remains with a certain predetermined range to make the gaming system both profitable and compliant with any relevant regulations.

An aggregate payback percentage of the gaming system 300 may be calculated as a function of the primary payback percentage (the payback percentage of the primary wagering game 360) as well as the payback percentages of any of the features 374 which have been enabled. When activated, the primary wagering game 360 is configured or set to a primary payback percentage. This primary payback percentage may be adjusted (upward or downward) in response to activation of one or more of the features 374. Each of the features 374 has its own corresponding bonus payback percentage that may be higher or lower than the primary payback percentage. Thus, the aggregate payback percentage is a function of, and affected by, the payback percentages of the activated features. In an embodiment, the aggregate payback percentage is also a function of the relative sizes of the primary wager and the any required supplemental wagers for activating the selected features 374. Thus, in an embodiment, the aggregate payback percentage is given by Equation 1 below, wherein "PP" stands for "payback percentage":

$$PP_{Aggregate} = \frac{(PP_{Primary})(Wager_{Primary}) + (PP_{Bonus\ 1})(Wager_{Bonus\ 1}) + (PP_{Bonus\ 2})(Wager_{Bonus\ 2})}{Wager_{Total}} \quad \text{Equation 1}$$

Thus, in an example configuration, a player wagers 20 coins on a primary wagering game having an 80% payback percentage, plus an additional 5 coins on a first bonus feature having a 92% payback percentage, and an additional 5 coins on a second bonus feature having a 102% payback percentage. In such an example, the aggregate payback percentage of the system is calculated as seen in Equation 2 below:

$$PP_{Aggregate} = \frac{(0.80)(20) + (0.92)(5) + (1.02)(5)}{30} = 0.8567 \quad \text{Equation 2}$$

Therefore, in the example given, the aggregate payback percentage is 85.67 percent. As seen, changes in the payback percentages of either the primary wagering game, or either of the activated bonus features would affect the aggregate payback percentage. Also, activation of additional bonus features would also affect the aggregate payback percentage. Thus, for a primary wagering game having a primary payback percentage, having at least one bonus feature activated, the general equation for the aggregate payback percentage is given in Equation 3, where N features are enabled:

$$PP_{Aggregate} = \frac{(PP_{Primary})(Wager_{Primary}) + \sum_{X=1}^{N}(PP_{Bonus\ X})(Wager_{Bonus\ X})}{Wager_{Total}} \quad \text{Equation 3}$$

In an embodiment, activation of successive additional features 374 from increasing Levels causes the aggregate payback percentage to increase. In other words, with each successive feature that is enabled, the aggregate payback percentage increases due to the addition of a feature 374 having a higher payback percentage. However, although features 374 having increasingly higher payback percentages are permitted to be activated, in an embodiment the rule set limits the overall, or aggregate payback percentage within a predefined range. Thus, for example, the aggregate payback percentage of the system 300 may be limited to be within the range of 80% to 98%. Other embodiments and configurations are possible as well. Various controls or mechanisms may be used by the rule set to accomplish such a limiting function. For example, features 374 or subsets thereof may be deactivated so as to be unable to be selected if activation would force the aggregate payback percentage out of the allowable range.

Figure 7:
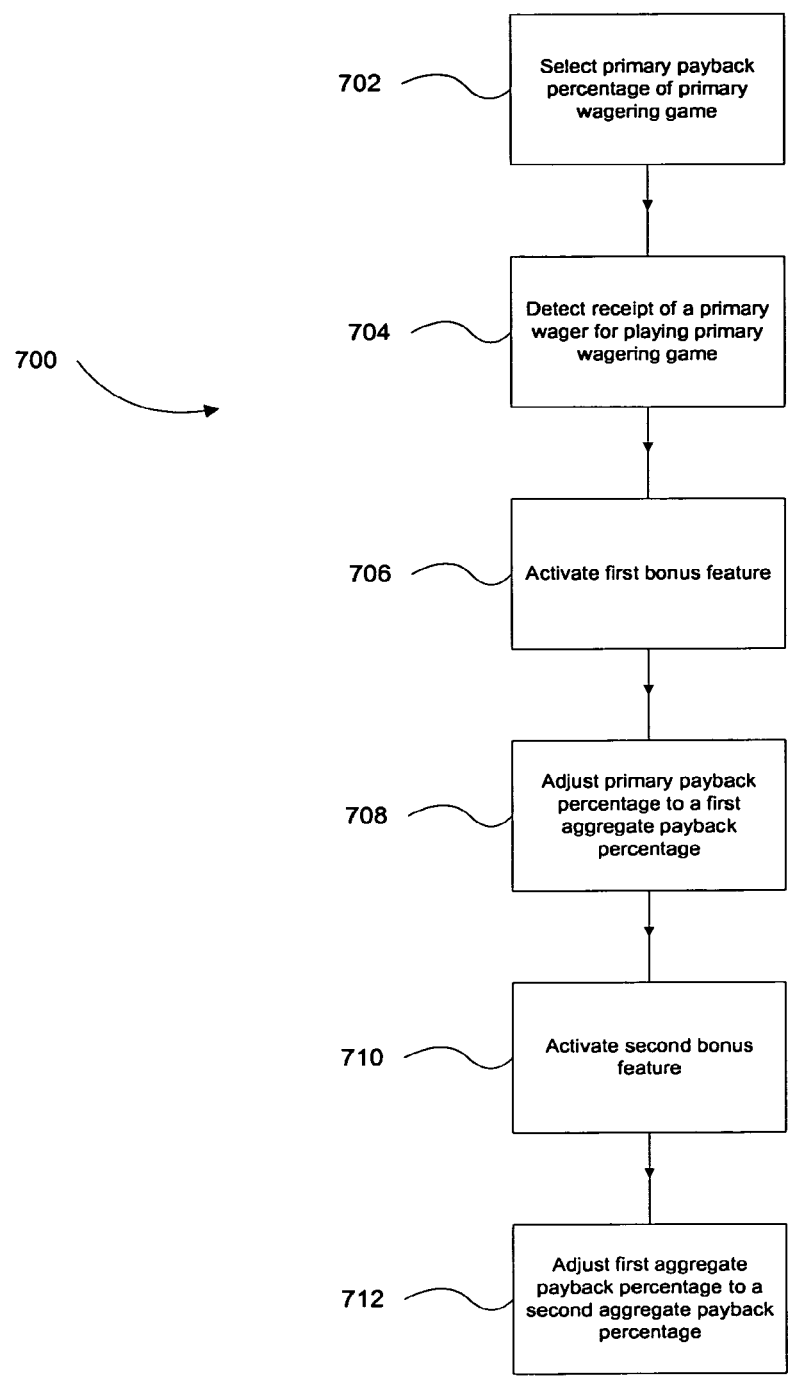
FIG. 7 is a flow chart of a method for adjusting an aggregate payback percentage of a gaming system.

Depicted in FIG. 7 is a flow chart of a method 700 for adjusting an aggregate payback percentage of a gaming system. At step 702, a primary payback percentage of a primary wagering game of the system is selected. At step 704, receipt of a primary wager for play of the primary wagering game is detected. At step 706, a first bonus feature is activated in response to a first bonus wager being received and a first bonus eligibility being satisfied. The first bonus feature has a first bonus payback percentage. In an embodiment, the first bonus eligibility may include a player placing a "max bet" or the maximum possible primary wager on the primary game. The first bonus feature has a first bonus payback percentage. At step 708, the primary payback percentage is adjusted to a first aggregate payback percentage, as a function of the primary payback percentage and the first bonus payback percentage. In an embodiment, the first aggregate payback percentage is a function of the primary payback percentage and the first bonus payback percentage. In an alternative embodiment, the first aggregate payback percentage is also a function of the size of the primary wager and the size of the first bonus wager. Thus, the second aggregate payback percentage may be a weighted average, taking into account the payback percentages and the sizes of the wagers placed on the primary wagering game and the first bonus feature.

At step 710, a second bonus feature is activated in response to a second bonus wager being received and a second bonus eligibility being satisfied. The second bonus feature has a second bonus payback percentage. In an embodiment, the second eligibility requirement may include activation of the first feature. In such an embodiment, a player must activate a first feature in order to be able to activate a second feature. The second feature has a second bonus payback percentage. At step 712, the first aggregate payback percentage is adjusted to a second aggregate payback percentage, as a function of the primary payback percentage, the first bonus payback percentage and the second bonus payback percentage. In an embodiment, the second aggregate payback percentage is a function of the primary payback percentage, the first bonus payback percentage and the second bonus payback percentage. In other words, the second aggregate payback percentage is a function of the first aggregate payback percentage with the second bonus payback percentage factored in. In an alternative embodiment, the second aggregate payback percentage is also a function of the size of the primary wager, the size of the first bonus wager and the size of the second bonus wager. Thus, the second aggregate payback percentage may be a weighted average, taking into account the payback percentages and the sizes of the wagers placed on the primary wagering game, the first bonus feature and the second bonus feature. It should also be understood that the steps of the method 700 may be performed in the order shown in FIG. 7, or may be performed in another order in alternative embodiments.

Figure 8:
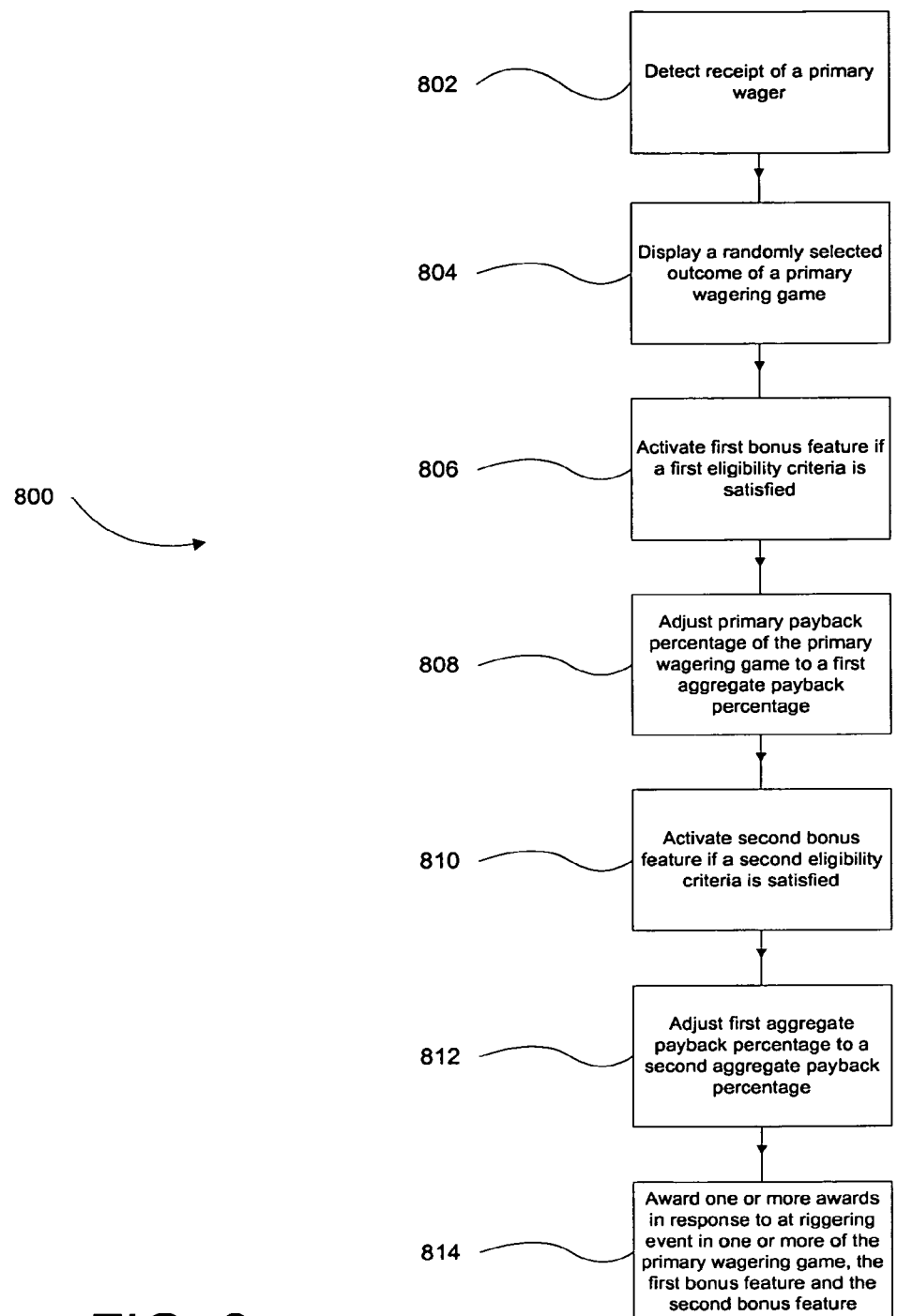
FIG. 8 is a flow chart of a method for operating a wagering game.

Depicted in FIG. 8 is a flow chart of a method 800 for operating a wagering game. In an embodiment, the wagering game may be supplemented by activating one or more available bonus features. At step 802, receipt of a primary wager is detected which enables play of a primary wagering game. At step 804, a randomly selected outcome of the primary wagering game is displayed. At step 806, a first bonus feature is activated if a first eligibility criteria is satisfied. At step 808, a primary payback percentage of the primary wagering game is adjusted to an aggregate payback percentage, which is a function of both the primary payback percentage and a first bonus payback percentage of the first bonus feature. At step 810, a second bonus feature is activated if a second eligibility criteria is satisfied. At step 812, the first aggregate payback percentage is adjusted to a second aggregate payback percentage, which is a function of the primary payback percentage, the first bonus payback percentage, and a second bonus payback percentage of the second bonus feature. At step 814, one or more awards are provided. The awards are in response to a triggering event in one or more of the primary wagering game, the first bonus feature, and the second bonus feature.

As explained, the first and second eligibility criteria may be any requirements necessary to activate the first and second features, respectively. In an embodiment, the first eligibility criteria includes the primary wager being a maximum wager, or "max bet." In an embodiment, the second eligibility criteria includes activation of the first bonus feature (i.e. the second bonus feature is only eligible for activation if a first bonus feature has already been activated). Moreover, there may be supplemental wager requirements as part of the first and second eligibility criteria. For example, the first and second eligibility criteria may include receipt of a first and second bonus wager, respectively. Other eligibility criteria may be utilized as well, instead of or in addition to the criteria explained herein. It should also be understood that the steps of the method 800 may be performed in the order shown in FIG. 8, or may be performed in another order in alternative embodiments. For example, step 804 (displaying a randomly selected outcome of the primary wagering game) may be performed between steps 812 and 814 (after the activation of the first and second bonus features, and adjustment of the payback percentages).

In alternative embodiments, other variations to the configurations depicted and described herein may be utilized. For example, the gaming system 300 may allow operators or players to select a desired aggregate payback percentage and in response thereto utilize the one or more rule sets to provide combinations of features 374 which when selected provide the desired aggregate payback percentage. Moreover, the rule sets can be configured so that a desired aggregate payback percentage can be selected, and one or more bonus features activated, and the rule set used to provide the appropriate wager amounts necessary on the primary wagering game and the activated features 374 to achieve the desired aggregate payback percentage. Other alternatives are possible as well.

In an embodiment, each of the features 374 enabled on the system 300 have outcomes that are independent of the outcomes on the primary wagering game 360. In other words, the features 374 may provide awards that are triggered independently of outcomes or awards in the primary wagering game 360. For example, independent features 374 include mystery triggered features, progressive jackpots, and time based trigger awards. In alternative embodiments, the features 374 may be dependent upon one or more outcomes in the primary wagering game 360. For example, a feature 374 may provide "free spins" or "extra selections" to a primary wagering game 360, thereby making the outcome of the feature 374 dependent on the outcomes of those spins or selections.

In yet another alternative embodiment, the features 374 which available for activation by a player of the primary wagering game 360 require one or more side bets or supplemental wagers. In one embodiment, the feature 274 may be a progressive jackpot feature which is activated by placing a side bet of a threshold or minimum amount. In such an embodiment, a player may be permitted to increase the size of the progressive jackpot by increasing the size of the side bet. Thus, for example, a one credit side bet may qualify the player for a $100 progressive jackpot, but a $2 side bet increases the progressive jackpot to $200. The relationship between jackpot size and side bet amount may be linear, as described, or may alternatively be non-linear, such as exponential. In another alternative embodiment, placement of a minimum side wager amount renders a player eligible for a progressive jackpot with a predetermined odds or likelihood of being triggered. By increasing the size of the side bet, the likelihood of the progressive jackpot being triggered increases, although the size of the jackpot may remain the same. Again, this relationship can be either linear or not.

In yet another alternative embodiment, the features 374 may be grouped or associated with one another on the feature menu 370 so as to form a game or other activity. In one example, a group of five features are located next to one another and take on graphical representations of puzzle pieces. A player activates one or more of the features 374 by touching a touch screen on the feature menu 370. Activated features 374 (or puzzle pieces) may change appearance, so as to reveal an underlying image. When a player activates all of the features 374 of a predetermined group (i.e. picks all of the puzzle pieces), he receives a supplemental bonus, for example in the form of an extra feature 374 being activated. Thus, in this example, by activating five features 374 of a preassociated group, the player gets a bonus feature 374 activated. This provides additional entertainment in the form of a puzzle or game for activating the available features 374. In another embodiment, the number of features 374 activated may determine a multiplier which is applied to the results of the feature. Thus, if a progressive jackpot of $100 is awarded to a player at a time when such player has only one feature activated, he receives the $100. However, if that same player were to have four other features activated for a total of five supplemental features, he would receive a 5× multiplier applied to the $100 award for a total award of $500.

In yet another alternative embodiment, instead of or in addition to the payback percentage escalation described herein, a reduction in side wagers could be provided. Thus, if a player activates a first feature and pays the requisite side wager amount, then the player may get a discount for a second, third, or other subsequent feature activated. In this way, activation of successive features is rewarded by a reduced cost in subsequent side wagers required. This causes there to be an incentive to the player to activate multiple features to enjoy the benefit of more supplemental features at a reduced cost. This reduced cost scheme could be employed with or without a complimentary increase in payback percentages for subsequent features, as described herein. Moreover, in some embodiments, the features may be grouped, associated, or packaged into discount packages, where the total of side wager required to activate such a group is less than the sum of the individual side wagers required of the features in the package if they were individually activated.

In other embodiments, other incentivization techniques may be employed to encourage players to activate more than one feature 374. For example, the amount of the sidebet for a second or subsequent feature 374 may be discounted or presented to the player as being "on sale" as a result of the player placing a first side bet to activate a first feature 374. Moreover, other techniques such as "buy one get one free" may be used to provide a special pricing on subsequent side bets for additional features. Special pricing can also be offered at certain times, or for certain periods of time, so as to further incentivize activation of additional features during such times. Many other group schemes and discounting schemes may be employed so as to incentivize players to activate additional subsequent features 374, or groups of features 374.

In yet another alternative embodiment, one or more features may be activated which require a sidebet, and a portion of each of the sidebets may be utilized to fund a secondary bonus event. For example, a player may activate a first feature, for example "Monopoly Big Event" (a board game event), and pay a first sidebet required for such activation. A player may then activate a second feature, for example "Jackpot Party Progressive" (a selection game), and pay a second sidebet required for such activation. A portion of both the first sidebet and the second sidebet are allocated to fund a secondary bonus event. In one embodiment, the secondary bonus event may be one or more progressive jackpots which are incremented in association with receipt of the portions of sidebets. Thus, a portion of the first and second sidebets is allocated to the same secondary bonus event.

In an embodiment, the secondary bonus event is a master secondary event which is visible and viewable on the gaming display during play of the primary wagering game and activated features. The secondary bonus event is funded by a portion of the sidebet for each activated feature regardless of how many features are activated by a player. In an embodiment, the secondary bonus event is an incentivizing device and configured to provide an enhanced award as more features are enabled (and paid for by sidebets). Thus, in the example described, as a player successively activates additional features, the chances of his triggering and being awarded the progressive jackpot increases. Other enhancement techniques may be utilized to provide a greater payback percentage, more frequent awards, or increase the likelihood that awards are provided. The secondary bonus event may be any kind of secondary game, jackpot, prize, or award. However, the secondary event is partially funded by sidebets for each feature activated by a player. In an embodiment, the secondary bonus event is distinct from the features.

The system 300 as described and shown in various embodiments herein, offers a number of advantages over traditional systems. The bonus features 374 available for activation provide a player with a way to customize his gaming experience while preserving a desirable aggregate payback percentage. In addition, the graphic display of rule sets within the feature menu 372 provides an easily understood visual representation of which features 374 are linked with other features for activation, and in what way they are linked. A hierarchy of increasingly greater payback percentages in the various features 374 provides players with greater enjoyment and anticipation due to the perceived generosity of the features 374 in the higher level tiers, while preserving a fair and customizable overall payback percentage for operators of the gaming system 300. Other benefits are provided in addition to those described herein.

Each of these embodiments and obvious variations thereof is contemplated as falling within the spirit and scope of the claimed invention, which is set forth in the following claims.

What is claimed is:
1. A method of operating a gaming system, the gaming system including one or more controllers and a gaming machine, the gaming machine primarily for playing a casino wagering game including a primary wagering game and one or more bonus features that can be included in the casino wagering game, the gaming machine including an electronic display device and one or more input devices, the method comprising:
   detecting, via at least one of the one or more input devices, a physical item associated with a monetary value that establishes a credit balance;
   displaying, on the electronic display device, a plurality of selectable bonus feature elements;
   allowing a player to build the casino wagering game by including one or more of the plurality of selectable bonus feature elements in a play of the casino wagering game, the allowing including:
  (i) receiving a selection of a first one of the plurality of selectable bonus feature elements thereby building the casino wagering game to include a first bonus feature associated with a first bonus payback percentage;
  (ii) receiving a selection of a second one of the plurality of selectable bonus feature elements thereby building the casino wagering game to include a second bonus feature associated with a second bonus payback percentage; and
  (iii) in response to the receiving of the selection of the first selectable bonus feature element, increasing an aggregate payback percentage of the casino wagering game and in response to the receiving of the selection of the second selectable bonus feature element, further increasing the aggregate payback percentage of the casino wagering game;
initiating the built casino wagering game in response to an input indicative of a wager covered by the credit balance; and
receiving, via at least one of the one or more input devices, a cashout input that initiates a payout from the credit balance.

2. The method of claim 1, further comprising prior to the receiving the selection of the second one of the plurality of selectable bonus feature elements, deactivating a third one of the plurality of selectable bonus feature elements thereby preventing selection of a third bonus feature associated with a third bonus payback percentage.

3. The method of claim 1, further comprising:
receiving a selection of a third one of the plurality of selectable bonus feature elements associated with a third bonus feature associated with a third bonus payback percentage;
calculating the aggregate payback percentage based in part on the third bonus payback percentage;
in response to the calculated aggregate payback percentage being greater than a predetermined limit, maintaining the aggregate payback percentage of the casino wagering game at the increased level based on the enabling of the first and the second bonus features; and
in response to the calculated aggregate payback percentage being equal to or less than the predetermined limit, increasing the aggregate payback percentage of the casino wagering game in response to the receiving of the selection of the third one of the plurality of bonus feature elements.

4. The method of claim 1, further comprising in response to a first triggering event associated with the first bonus feature, conducting the first bonus feature; and in response to a second triggering event associated with the second bonus feature, conducting the second bonus feature.

5. The method of claim 1, wherein the receiving the selection of the first one of the plurality of selectable bonus feature elements further includes receiving a first bonus wager in addition to the primary wager.

6. The method of claim 5, wherein the receiving the selection of the second one of the plurality of selectable bonus feature elements further includes receiving a second bonus wager in addition to the primary wager and in addition to the first bonus wager.

7. A gaming system comprising:
a casino gaming machine primarily for playing a casino wagering game including a primary wagering game and one or more bonus features that can be included in the casino wagering game, the casino gaming machine including an electronic display device and one or more input devices; and
one or more controllers configured to:
  detect, via at least one of the one or more input devices, a physical item associated with a monetary value that establishes a credit balance;
  direct the electronic display device to display a plurality of selectable bonus feature elements;
  allow a player to build the casino wagering game by including one or more of the plurality of selectable bonus feature elements in a play of the casino wagering game, the building including:
    receiving a selection of a first one of the plurality of selectable bonus feature elements thereby building the casino wagering game to include a first bonus feature associated with a first bonus payback percentage; and
    receiving a selection of a second one of the plurality of selectable bonus feature elements thereby building the casino wagering game to include a second bonus feature associated with a second bonus payback percentage, wherein an aggregate payback percentage of the casino wagering game increases upon the including of the first bonus feature in the casino wagering game and further increases upon the including of the second bonus feature in the casino wagering game;
  initiate the built casino wagering game in response to an input indicative of a wager covered by the credit balance; and
  receive, via at least one of the one or more input devices, a cashout input that initiates a payout from the credit balance.

8. The gaming system of claim 7, wherein the aggregate payback percentage is not increased upon including a third bonus feature associated with a third bonus payback percentage in the casino wagering game if such an increase would make the aggregate payback percentage higher than an upper limit of a predetermined range for the aggregate payback percentage.

9. The gaming system of claim 7, wherein the first bonus payback percentage and the second bonus payback percentage are substantially equal.

10. The gaming system of claim 7, wherein the receiving the selection of the first one of the plurality of selectable bonus feature elements further includes receiving a first bonus wager in addition to the primary wager, and wherein the receiving the selection of the second one of the plurality of selectable bonus feature elements further includes receiving a second bonus wager in addition to the primary wager and in addition to the first bonus wager.

11. The gaming system of claim 7, wherein a primary payback percentage is associated with the primary wagering game, and wherein each of the first bonus payback percentage and the second bonus payback percentage is greater than the primary payback percentage.

12. The gaming system of claim 11, wherein the aggregate payback percentage is a function of the primary payback percentage, the first bonus payback percentage, and the second bonus payback percentage.

13. A method of operating a gaming system, the gaming system including one or more controllers and a gaming machine, the gaming machine primarily for playing a casino wagering game including a primary wagering game and bonus features that can be enabled and playable in conjunction with the primary wagering game, the gaming machine including an electronic display device and one or more input devices, the method comprising:

detecting, via at least one of the one or more input devices, a physical item associated with a monetary value that establishes a credit balance;

allowing a player to build the casino wagering game, the allowing including:

receiving an input corresponding to a desired aggregate payback percentage for the casino wagering game;

in response to the receiving, displaying, on the electronic display device, at least a first combination of the bonus features and a second combination of the bonus features, the first and the second combinations of the bonus features when enabled providing the desired aggregate payback percentage for the casino wagering game; and receiving a selection of either the first or the second combination of the bonus features;

initiating the built casino wagering game in response to an input indicative of a wager covered by the credit balance; and receiving, via at least one of the one or more input devices, a cashout input that initiates a payout from the credit balance.

14. The method of claim 13, further comprising, in response to the initiating, conducting the built casino wagering game with the desired aggregate payback percentage.

15. The method of claim 13, wherein the first combination of the bonus features includes a first bonus feature and a second bonus feature, the first bonus feature being associated with a first bonus payback percentage and the second bonus feature being associated with a second bonus payback percentage that is higher than the first bonus payback percentage.

16. The method of claim 13, further comprising receiving a bonus wager for playing either the first or the second combination of the bonus features.

17. A gaming system comprising:

a casino gaming machine primarily for playing a casino wagering game including a primary wagering game and one or more bonus features that can be enabled and included in the casino wagering game, the casino gaming machine including an electronic display device and one or more input devices; and one or more controllers configured to:

detect, via at least one of the one or more input devices, a physical item associated with a monetary value that establishes a credit balance;

allow a player to build the casino wagering game, the allowing including:

receiving an input corresponding to a desired aggregate payback percentage for the casino wagering game;

in response to the receiving, direct the electronic display device to display a plurality of selectable elements, each of the selectable elements being associated with a respective set of the bonus features and being selectable to provide the desired aggregate payback percentage for the casino wagering game; and receiving a selection of a first one of the selectable elements thereby enabling a first set of the bonus features;

establish an aggregate payback percentage of the casino wagering game as the desired aggregate payback percentage upon enabling of the first set of the bonus features;

initiate the built casino wagering game in response to an input indicative of a wager covered by the credit balance; and receive, via at least one of the one or more input devices, a cashout input that initiates a payout from the credit balance.

18. The gaming system of claim 17, wherein a primary payback percentage is associated with the primary wagering game and wherein an aggregate bonus payback percentage is associated with the first set of the bonus features, the aggregate bonus payback percentage being greater than the primary payback percentage.

19. The gaming system of claim 18, wherein the aggregate payback percentage is a function of the primary payback percentage and the aggregate bonus payback percentage.

\* \* \* \* \*